United States Patent Office.

CHARLES B. HARRIS, OF NEW YORK, N. Y.

Letters Patent No. 112,339, dated March 7, 1871; antedated February 25, 1871.

IMPROVEMENT IN COMPOSITIONS FOR PAVEMENTS.

The Schedule referred to in these Letters Patent and making part of the same.

*To all whom it may concern:*

Be it known that I, CHARLES B. HARRIS, of the city and county of New York and State of New York, have invented a new and useful Composition for Paving, Flooring, Roofing, and other similar purposes; and I do hereby declare that the following is a full, clear, and exact description thereof.

This invention relates to an improvement in compositions for paving, flooring, and similar purposes, which are composed in part of natural or artificial asphaltum or bitumen.

My invention consists in altering or subduing the excessive plasticity which the asphaltic materials have at the increased temperatures of the climate by the addition of steatite and clay, either or both; the latter-named substances having of themselves an unctuous or non-gritty nature, they add none of that brittle or granular character to the asphaltic compound, in this respect differing from all silicious and granular preparations.

The invention further consists in the addition to the above-named materials of mica or micaceous rocks.

The mica has the property of binding the whole mass, when laid, in such a way that it is better enabled to resist rupture by sudden changes of temperature or by shock; and it has also an elastic nature, which is imparted to the compound.

The mica, steatite, and clay, when thoroughly mixed, cemented, and compressed with asphalt, have such properties that the wear and tear of attrition is reduced to a minimum.

The micaceous rock, the steatite, and the clay are subjected to the following mechanical treatment:

The micaceous rock is brought to a state of fine division by means of machinery that is ordinarily used for similar purposes, and the mica is as thoroughly separated from other materials as possible by means of the ordinary methods of screening, or preferably by the force of wind driven through the powdered rock.

The steatite and clay are powdered by grinding or by crushing, and then screened from the coarser powder.

After these materials have been mechanically treated substantially as above described they are mixed in proportions best suited to the case, and then heated to about 300° Fahrenheit, and stirred with the melted asphalt to a coherent waxy mass, when it is ready for application.

In some instances it may be applied to well-prepared ground, but generally it must be preceded by an asphaltic or a hydraulic concrete or base.

In all cases it is necessary to compress the freshly-prepared material (after it has been spread) while yet hot, by means of tampers or rollers.

When used for roofing or tiling it may be either laid in one continuous sheet, or in tiles or bricks, cemented with asphalt.

The proportions of clay, steatite, and mica depend upon the character of the wear and tear the material will be subjected to.

For streets and roads there should be about one-third ($\frac{1}{3}$) of an equal mixture of clay and steatite, and two-thirds ($\frac{2}{3}$) of mica.

For sidewalks or paths a larger proportion of steatite than clay should be used.

For floors and cellars clay (without steatite) mixed with about fifty (50) per cent. of mica may be used to the best advantage.

What I claim as new, and desire to secure by Letters Patent, is—

A composition for paving, flooring, and roofing, composed of steatite and clay, together with mica or micaceous rocks, crushed or pulverized, and mixed with asphalt, as herein described and set forth.

CHARLES B. HARRIS.

Witnesses:
 JOHN C. ADAMS,
 HIRAM P. CROFFUT.